April 21, 1959 — J. E. BUSKIRK — 2,883,444
NONOVERFILL DEVICE
Filed Nov. 23, 1956
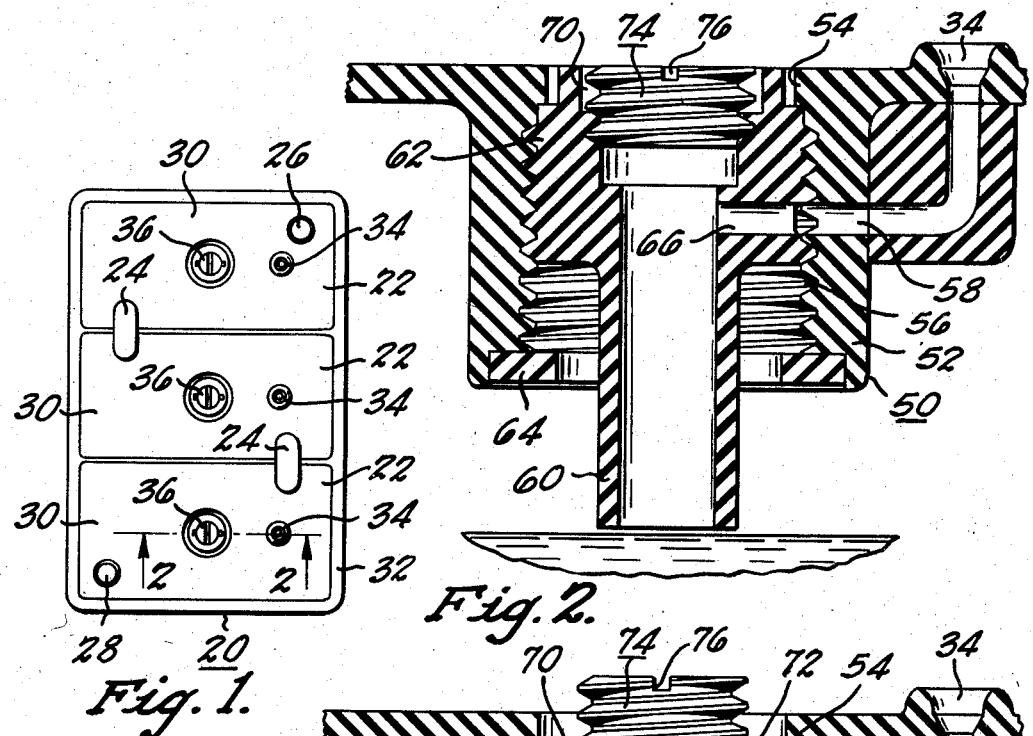
Fig. 1.
Fig. 2.
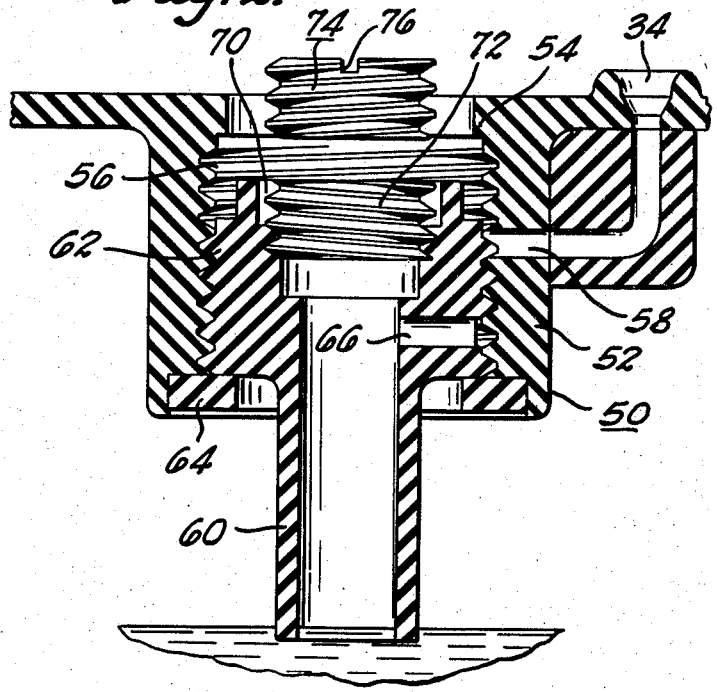
Fig. 3.
INVENTOR.
JOHN E. BUSKIRK
BY
HIS ATTORNEY

United States Patent Office 2,883,444
Patented Apr. 21, 1959

2,883,444

NONOVERFILL DEVICE

John E. Buskirk, Muncie, Ind., assignor to General Motors Corporation, Detroit, Mich., a corporation of Delaware Application November 23, 1956, Serial No. 624,054

3 Claims. (Cl. 136—178)

This invention relates to nonoverfill devices.

It is an object of the invention to provide a nonoverfill device for use in connection with a storage battery wherein battery acid or water may be added to the battery cells through the device and wherein the quantity of water which may be filled into the cell is predetermined.

Another object of the invention is to provide a nonoverfill device which includes an integral vent effective only when the overfill device is closed with respect to receiving liquid therethrough.

A still further object of the invention is to provide a nonoverfill device including two threaded portions having opposite pitched threads thereon so that the removal of one portion of the device for filling purposes automatically conditions the other portion thereof by closing the vent and vice versa.

Further objects and advantages of the present invention will be apparent from the following description, reference being had to the accompanying drawings wherein preferred embodiments of the present invention are clearly shown.

In the drawings:

Figure 1 is a plan view of a typical three cell storage battery.

Figure 2 is a sectional view taken on line 2—2 of Figure 1 wherein the nonoverfill device is in venting position.

Figure 3 is a sectional view taken on line 2—2 of Figure 1 wherein the nonoverfill device is in the filling position.

Nonoverfill devices have been used in connection with storage batteries of the lead-acid type to prevent overfilling of the battery cells, particularly when water is being added to the electrolyte. These devices, for the most part, have been rather complicated in design and have, therefore, created problems in manufacture which, to a large degree, have limited their use.

The present invention is directed to a nonoverfill device which is simple in construction and thereby inexpensive to produce wherein the parts of the device are few in number and wherein the device is automatic in its operation from filling to venting position and vice versa.

The device can be constructed in a portion of the cell cover or it may be a separate unit which is insertable in the cell cover as desired.

Referring to the drawings, the top of a typical three cell battery is shown at 20 in Figure 1 wherein the separate cells 22 are electrically connected by means of connector strips 24 in series relation. Terminals 26 and 28, of opposite polarity, are provided and each cell 22 is covered by means of a cell cover 30 suitably sealed to the case 32. Vents for each cell are also provided at 34. Each of the three cells includes a filler opening noted at 36 through which electrolyte may be poured into the cell and through which water may be added to the electrolyte during use of the battery.

Specifically, this invention is directed to a nonoverfill device which is incorporated in the filler opening of a storage battery and this device may be incorporated as an integral part of the cell cover or the entire assembly may be positioned within a cell cover and sealed thereto as desired. It is understood, of course, that the battery shown at 20 in Figure 1 is exemplary of a three cell battery and that the specific nonoverfill device is equally useful in connection with any battery, whether it is a single cell or a multi-cell battery including any number of cells.

Referring specifically to Figure 2, the device 50 includes an apertured boss 52 which has an inwardly extending apertured flange 54 at the upper end thereof and which also includes internal threads 56. Passing through the wall of the boss 52 and intersecting the threads is a vent passage 58 which connects to the external vent 34.

A tubular member 60 having an enlarged externally threaded upper end portion 62 is adapted to screw into the threads 56 and is limited in its upward movement by the flange 54. In order to prevent the tubular member 60 from becoming disengaged from the boss 52, a washer 64 is cemented in an annular recess at the bottom of the boss 52 to act as a locking means.

At the enlarged upper end 62 of the member 60, there is provided a cross bore, or passage, 66 which intersects the threads and opens into the bore of the member 60. This passage 66 is adapted in one position to align itself with the vent passage 58. In this connection, it is desirable to have the threads of the member 60 grooved so that the passage 66 will always communicate with the passage 58 when the axis thereof is in the same plane as the axis of the passage 58.

A recess 70, concentric with the bore of the member 60, is provided in the upper end of the enlarged portion 62 thereof. This recess is threaded at 72 with a thread having a reverse pitch to the thread on the external surface of the enlarged portion 62. Thus, if one thread is righthand, the other thread is lefthand, or vice versa. A cap 74 is provided which includes a tool slot 76. The cap 74 is threaded to mate with the thread 72. The cap 74 may, therefore, be threaded into the thread 72 until it bottoms as noted in Figure 2 which seals the tubular bore from the upper end of the device.

The operation of the device is as follows. When the parts are in the position shown in Figure 2, the bore of the member 60 is sealed by means of the cap 74. However, since the passage 66 is in alignment with passage 58, the cell to which the device is associated may vent through the bore of the tubular member 60, passage 66, passage 58 through the vent 34 to the atmosphere. When it is desired to fill the battery, that is, to replenish water or add electrolyte, etc., the cap 74 is removed by utilizing a tool in the slot 76. Turning the cap 74 in a direction to unscrew the same will cause the enlarged portion 62 to move in the opposite direction, namely, downwardly until the enlarged portion 62 bottoms on the annular ring 64. When this occurs, additional turning of the tool will cause the cap 74 to unscrew from the thread 72. In this position, the passage 66 is disconnected from the passage 58 and the only communication from the inside of the cell to the atmosphere is through the tube attached to device 60. Water may now be poured into the cell through the tube and, when the level thereof reaches the level of the bottom of the tube, substantially no more water can be added since it will fill up the tube and overflow. However, even if this occurs, there will be adequate space above the main level of the electrolyte in the cell, a space substantially equal to the distance from the bottom side of the top of the cell to the lower end of the tube on the device 60. The electrolyte may fill into the tube a short distance due to compression of the atmosphere above the main level of the electrolyte. However, when the cap 74 is again screwed in the threads 72, it will seal the tube from the atmosphere and as the threads bottom, continued turning of the cap will cause the enlarged portion 62 of the device 60 to move upwardly in its reverse thread to a position abutting the flange 54, in which position the passages 66 and 58 are again aligned to permit venting of the cell. This movement also raises the tube upwardly slightly above the level of the electrolyte, whereby normal operation of the battery will continue until it is desired to fill the same whereupon the operations herein described are repeated for accomplishing that end.

It will be noted that the device uses threads of opposite pitch in order to remove the cap and simultaneously condition the tube in the nonoverfill device so as to prevent overfilling of the battery. Replacement of the cap seals the battery with respect to the tube but automatically opens vent passages for venting purposes. Thus, the device presents a simple and inexpensive nonoverfill means which is substantially automatic in its operation and wherein the mere removal or replacement of the sealing cap conditions the device for either filling or venting as the case may be.

While the embodiments of the present invention as herein disclosed constitute preferred forms, it is to be understood that other forms might be adopted.

What is claimed is as follows:

1. A nonoverfill device for use with a lead acid storage battery including a cell compartment and a cell cover having a threaded filler opening therethrough and including a vent passage in the cover opening at one end on the horizontal external surface thereof and in the vertical threaded portion of the wall of the filler opening at the other end thereof, the combination comprising; an elongated tubular member extending downwardly through said cell cover and carrying external threads at its upper end which are adapted to be screw threaded into said threaded filler opening whereby the tubular member may be threadably moved to upper and lower extreme positions with respect to said cover, stop members at either end of said threaded bore for limiting the movement of said tubular member, said tubular member including a bore therethrough which is enlarged and internally threaded at its upper end with threads having the opposite pitch to the external threads thereon, a horizontal cross passage in said tubular member intersecting the bore and opening into the external threaded portion thereof and positioned so as to be aligned with said vent passage only in the upper extreme position of said tubular member, a cap adapted to be threaded into the internal threads at the enlarged upper end of said bore in said tubular member for simultaneously closing the tubular member and for threading the tubular member to its upper position wherein said cross passage is aligned with said vent passage, said cap during removal from said tubular member causing the tubular member to be threaded downwardly for misaligning the cross passage thereof with the vent passage for positively closing the vent passage due to the opposite pitch of the threads on the cap and on the external surface of the tubular member.

2. A nonoverfill device for use with a lead acid storage battery, comprising in combination; a cover, an apertured boss on said cover including an inwardly extending apertured flange at its upper end and threads beneath said flange, a vent passage transversely disposed in said boss and intersecting said threads and extending upwardly and opening on the external surface of said cover, an elongated tubular member including external threads thereon which are adapted to be engaged with the threads in said boss, a transverse passage in said tubular member adapted to align with said vent passage when the tubular member is screw threaded upwardly in the boss into engagement with said apertured flange, threads at the upper inner surface of said tubular member having a pitch opposite to the pitch of the threads at the external surface thereof, a plug adapted to be screwed into the internal threads of the tubular member whereby the tubular member is threaded upwardly into engagement with said flange as the plug is inserted and is screwed downwardly away from said flange as the plug is removed for closing the vent passage by misalignment of the transverse passage therewith, and means at the lower end of the boss for limiting the downward threaded movement of said tubular member.

3. A nonoverfill device for a storage battery having a threaded filler aperture therein, comprising; an elongated tubular member with an aperture therethrough, said member having at its upper end external threads engaging the threads of said filler aperture and internal threads having a pitch opposite to the pitch of the external threads, upper and lower stop means for limiting threaded movement of said tubular member, and a cap adapted to threadedly engage the internal threads of said tubular member for simultaneously closing the tubular member and for threading the tubular member against the upper stop means, said cap during removal from said tubular member causing the tubular member to be threaded downwardly against the lower stop means, said tubular member when in the lower position preventing the venting of gas from the upper portion of the battery cavity.

References Cited in the file of this patent

UNITED STATES PATENTS

| | | |
|---|---|---|
| 2,175,993 | Lighton | Oct. 10, 1939 |
| 2,257,514 | Raney | Sept. 30, 1941 |
| 2,306,982 | Rolph | Dec. 29, 1942 |
| 2,335,157 | Nassimbene | Nov. 23, 1943 |
| 2,385,624 | Godber | Sept. 25, 1945 |
| 2,407,826 | Godber | Sept. 17, 1946 |
| 2,506,952 | Doughty | May 9, 1950 |
| 2,649,494 | Martin | Aug. 18, 1953 |